United States Patent [19]
Ishizaka et al.

[11] Patent Number: 5,751,877
[45] Date of Patent: May 12, 1998

[54] SEMICONDUCTOR LASER MODULE

[75] Inventors: Tetsuo Ishizaka, Sapporo; Toshio Ohya, Kawasaki; Shunichi Satoh, Sapporo; Noboru Sonetsuji; Manabu Komiyama, both of Kawasaki, all of Japan

[73] Assignee: Fujitsu Limited, Kawasaki, Japan

[21] Appl. No.: 621,092

[22] Filed: Mar. 22, 1996

[30] Foreign Application Priority Data

Sep. 7, 1995 [JP] Japan .................. 7-230238

[51] Int. Cl.$^6$ .................. G02B 6/36
[52] U.S. Cl. .................. 385/93; 385/88
[58] Field of Search .................. 385/88–94, 33–35; 372/36, 101; 359/808, 811, 813, 814, 820, 823

[56] References Cited

U.S. PATENT DOCUMENTS 5,195,155  3/1993  Shimaoka et al. .............. 385/90
5,345,373  9/1994  Tanida ........................... 372/101
5,537,503  7/1996  Tojo et al. ...................... 385/93

*Primary Examiner*—Rodney B. Bovernick
*Assistant Examiner*—Hemang Sanghavi
*Attorney, Agent, or Firm*—Staas & Halsey

[57] ABSTRACT

A semiconductor laser module includes a semiconductor laser assembly formed by containing a semiconductor laser in a package, a lens assembly fixed by welding to the package of the semiconductor laser assembly, and a fiber assembly fixed by welding to the lens assembly. The semiconductor laser assembly includes a base fixed to the package and a carrier fixed to the base. The semiconductor laser is mounted on the carrier. A lens holder of the lens assembly is spot-welded to the package at a plurality of positions set below the upper surface of the base.

15 Claims, 13 Drawing Sheets

SEMICONDUCTOR LASER MODULE

BACKGROUND OF THE INVENTION

1. Field of the Invention

The present invention relates to a semiconductor laser module having a semiconductor laser (laser diode) and an optical fiber optically connected to the semiconductor laser.

2. Description of the Related Art

In an optical communication system employing an optical fiber as a transmission line, a semiconductor laser module is used. In the semiconductor laser module, the semiconductor laser and an incident end surface of the optical fiber are fixed with a predetermined positional relation therebetween maintained, and a condenser lens is provided between the semiconductor laser and the incident end surface of the optical fiber, so as to introduce a laser beam emerged from the semiconductor laser into the optical fiber. In this kind of semiconductor laser module, the positional relation between components of the module has a direct influence upon an optical coupling efficiency, so that the components must be positioned with a very high accuracy of 1 μm or less. Further, this positioning accuracy must be maintained over a long period of time.

A general semiconductor laser module is composed of a semiconductor laser assembly having a semiconductor laser chip, a lens assembly fixed by welding to the semiconductor laser assembly, and a fiber assembly fixed by welding to the lens assembly. The semiconductor laser chip is mounted on a carrier; the carrier is mounted on a base; and the base is fixedly mounted on the inside surface of a package having a transparent window. The lens assembly includes a lens holder and a lens press-fitted in the lens holder. The lens assembly is spot-welded to the semiconductor laser assembly after the optical axis of the lens assembly is aligned with that of the semiconductor laser assembly.

The fiber assembly includes a holder, a ferrule inserted and fixed in the holder, and an optical fiber inserted and fixed in the ferrule. The fiber assembly is spot-welded to the lens assembly after the optical axis of fiber is aligned with that of the lens assembly. Thus, all the assemblies are fixed together by welding after their optical axes are aligned with each other. Accordingly, a laser beam emerged from the semiconductor laser chip mounted on the carrier is coupled to the optical fiber by the lens of the lens assembly.

The members used in the semiconductor laser module are formed of different metals having different coefficients of linear expansion because of characteristics and manufacturability of the members or in order to maintain sealability of the package. For example, the package and the base of the semiconductor laser assembly are formed of Kovar having a coefficient of linear expansion of $6 \times 10^{-6}$. In contrast, the carrier of the semiconductor laser assembly is formed of copper having a coefficient of linear expansion of $18 \times 10^{-6}$. Further, the lens holder of the lens assembly and the holder of the fiber assembly are formed of stainless steel having a coefficient of linear expansion of $19 \times 10^{-6}$.

Thus, the semiconductor laser module is composed of various members formed of different metals having different coefficients of linear expansion. Accordingly, the positional relation between the members is changed by a difference in thermal expansion between the members when temperature changes, causing optical axis misalignment. As a result, a light output from the semiconductor laser module varies.

SUMMARY OF THE INVENTION

It is therefore an object of the present invention to provide a semiconductor laser module which can suppress the optical axis misalignment between a semiconductor laser and a lens due to a temperature change to thereby reduce a variation in light output.

In accordance with an aspect of the present invention, there is provided a semiconductor laser module comprising a semiconductor laser assembly comprising a package having a transparent window, a base fixedly mounted on an inside surface of the package, a carrier fixedly mounted on the base, and a semiconductor laser mounted on the carrier; a lens assembly fixed by welding to the package, the lens assembly comprising a lens holder and a lens press-fitted in the lens holder; and a fiber assembly fixed by welding to the lens assembly, the fiber assembly comprising a holder, a ferrule inserted and fixed in the holder, and an optical fiber inserted and fixed in the ferrule; the lens holder being spot-welded to the package at a plurality of positions set below an upper surface of the base.

The lens holder is spot-welded to the package at a plurality of positions set below the upper surface of the base. Accordingly, if the coefficients of linear expansion of the lens holder and the carrier are equal to each other, the lens holder and the carrier are equally displaced with a temperature change. Therefore, there occurs no optical axis misalignment between the semiconductor laser and the lens.

In accordance with another aspect of the present invention, there is provided a semiconductor laser module comprising a semiconductor laser assembly comprising a package having a transparent window, a base fixedly mounted on an inside surface of the package, a carrier fixedly mounted on the base, and a semiconductor laser mounted on the carrier; a lens assembly fixed by welding to the package, the lens assembly comprising a lens holder and a lens press-fitted in the lens holder, the lens holder having a plurality of slits; and a fiber assembly fixed by welding to the lens assembly, the fiber assembly comprising a holder, a ferrule inserted and fixed in the holder, and an optical fiber inserted and fixed in the ferrule.

Since the lens holder is fixed by welding to the package, a thermal expansion amount of the lens holder due to a temperature rise can be suppressed to substantially the same as that of the package. However, since the slits are formed in the lens holder, a portion of the lens holder in the vicinity of the slits is allowed to freely thermally expand without restriction by the package. Accordingly, the lens can be displaced under substantially the same condition as that of the carrier, thereby preventing the optical axis misalignment between the semiconductor laser and the lens.

In accordance with a further aspect of the present invention, there is provided a semiconductor laser module comprising a semiconductor laser assembly comprising a package having a transparent window, a base fixedly mounted on an inside surface of the package, a carrier fixedly mounted on the base, and a semiconductor laser mounted on the carrier; a lens assembly fixed by welding to the package, the lens assembly comprising a lens holder and a lens press-fitted in the lens holder; and a fiber assembly fixed by welding to the lens assembly, the fiber assembly comprising a holder, a ferrule inserted and fixed in the holder, and an optical fiber inserted and fixed in the ferrule; wherein the relation of $L1(\alpha1-\alpha3)=L2(\alpha3-\alpha2)$ is satisfied where $\alpha1$, $\alpha2$, and $\alpha3$ represent coefficients of linear expansion of the carrier, the base, and the package, respectively, and L1 and L2 represent vertical thicknesses of the carrier and the base, respectively.

By selecting the coefficients of linear expansion of the carrier, the base, and the package and the vertical thicknesses of the carrier and the base so as to satisfy the above relation, the position of a laser beam emitted from the semiconductor laser can be maintained always at a constant position regardless of a temperature change. Therefore, a variation in light output due to a temperature change can be suppressed.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
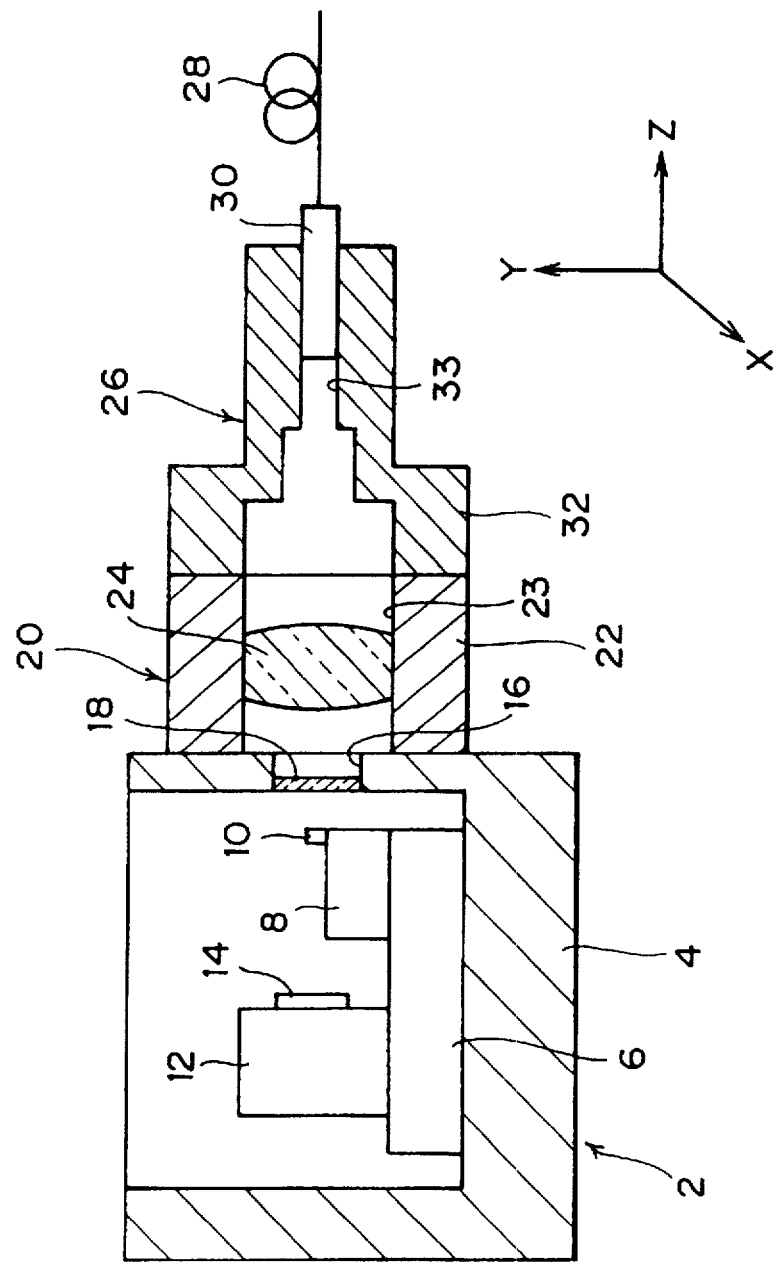
FIG. 1 is a sectional view of a first preferred embodiment of the present invention.

Referring to FIG. 1, there is shown a sectional view of a semiconductor laser module according to a first preferred embodiment of the present invention. A package 4 of a semiconductor laser assembly 2 has an opening 16, and a transparent window 18 formed of sapphire or the like is provided in the opening 16. The package 4 is formed of Kovar (tradename) having a composition of 54% of Fe, 29% of Ni, and 17% of Co, and has a coefficient of linear expansion of $6\times10^{-6}$.

A base 6 formed of Kovar is fixed by laser welding to the inside bottom surface of the package 4. A laser diode carrier (LD carrier) 8 formed of copper is fixed by welding to the upper surface of the base 6. Copper has a coefficient of linear expansion of $18\times10^{-6}$. A photodiode carrier (PD carrier) 12 is fixed also to the upper surface of the base 6. The PD carrier 12 is formed of ceramic, and it is soldered to the base 6 after the ceramic surface is metallized.

A semiconductor laser chip or laser diode chip (LD chip) 10 is fixed by bonding to the upper surface of the LD carrier 8. A photodiode 14 is fixed by bonding to the side surface of the PD carrier 12. A cover (not shown) is welded to the package 4, thereby sealing the package 4.

Reference numeral 20 denotes a lens assembly, which includes a cylindrical lens holder 22 formed of stainless steel and a lens 24 press-fitted within a bore 23 of the lens holder 22. Stainless steel has a coefficient of linear expansion of $19\times10^{-6}$. After aligning the optical axes of the semiconductor laser assembly 2 and the lens assembly 20, the lens holder 22 of the lens assembly 20 is fixed by welding to the package 4 of the semiconductor laser assembly 2 by a method to be hereinafter described in detail.

Reference numeral 26 denotes a fiber assembly, which includes a holder 32 having a bore 33, a ferrule 30 inserted in the bore 33 and fixed therein by laser welding, and an optical fiber 28 inserted and fixed in the ferrule 30. The holder 32 is formed of stainless steel like the lens holder 22. After adjusting the optical axis of the fiber assembly 26 so that a laser beam from the LD chip 10 is optimally coupled to the optical fiber 28, the fiber assembly 26 is welded to the lens assembly 20.

With this arrangement, the laser beam emitted forward from the LD chip 10 is transmitted through the transparent window 18, and is next coupled to the optical fiber 28 in the fiber assembly 26 by the lens 24 in the lens assembly 20. On the other hand, the laser beam emitted backward from the LD chip 10 is detected by the photodiode 14 to feedback control the output power of the LD chip 10.

As mentioned above, the semiconductor laser module is assembled by using different metals, so that the positional relation between the members of the semiconductor laser module is changed with a temperature change because of the difference in amount of thermal expansion between these members. Accordingly, assuming that the laser beam emitted from the LD chip 10 is optimally coupled to the optical fiber 28 at 0° C., a misalignment in a Y-axis direction between the LD chip 10 and the lens 24 at 70° C. becomes about 0.8 μm.

Figure 2:
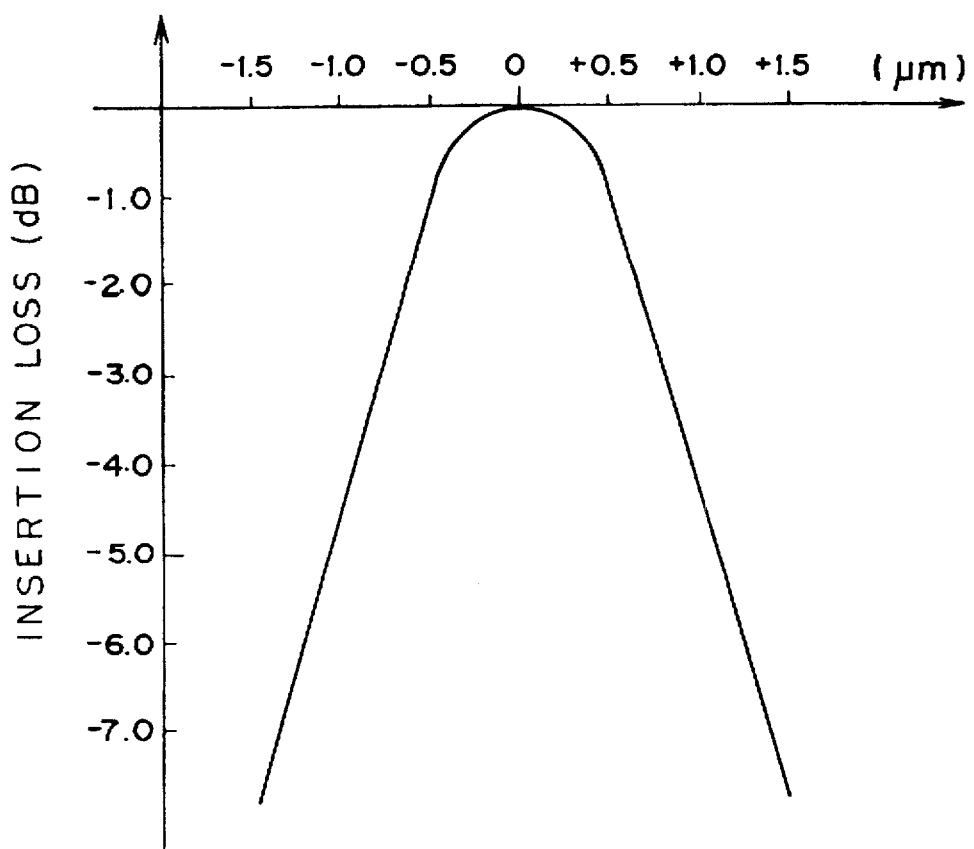
FIG. 2 is a graph showing the relation between optical axis misalignment and insertion loss.

FIG. 2 shows the relation between an insertion loss and an optical axis misalignment in the Y-axis direction between the LD chip 10 and the lens 24. As is apparent from FIG. 2, a light output decreases by about 3 dB with a temperature change from 0° C. to 70° C. Such a change in light output due to a temperature change is caused by a difference in coefficient of linear expansion between the LD carrier 8 and the package 4. In view of this fact, the optical axis misalignment in the Y-axis direction between the LD chip 10 and the lens 24 due to the difference in coefficient of linear expansion between the LD carrier 8 and the package 4 can be canceled by adopting a fixing method for making a displacement of the lens 24 equal to a displacement of the LD chip 10.

Figure 3:
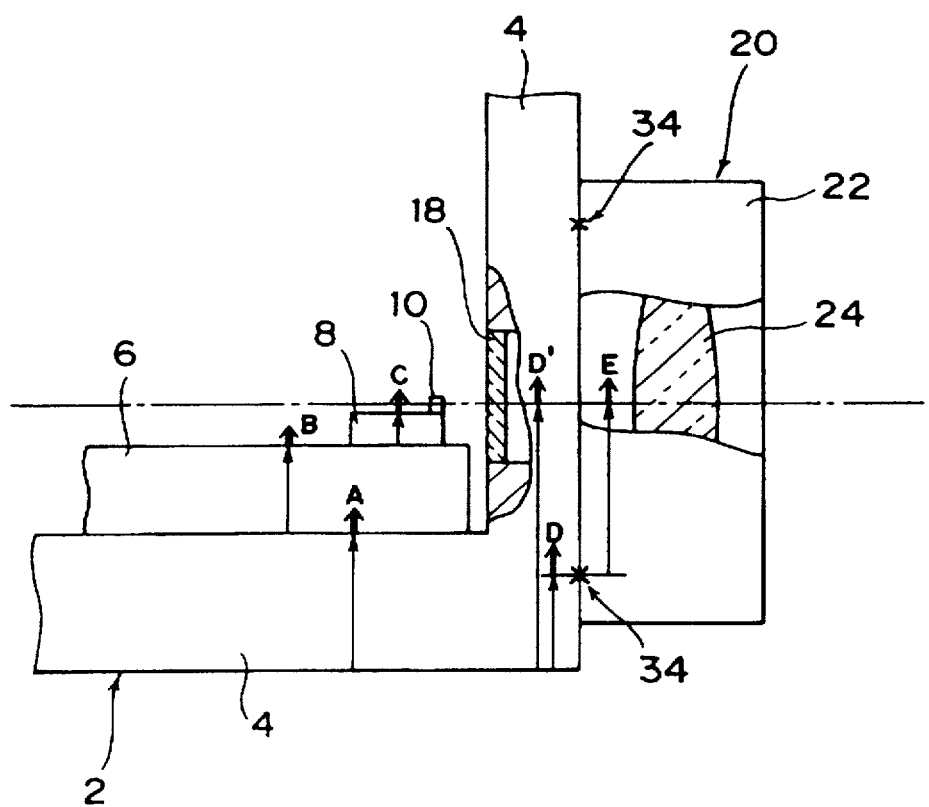
FIG. 3 is a partially sectional view showing a conventional fixing structure such that a lens assembly is fixed by laser welding to a package at a plurality of positions set over the entire outer circumference of the lens assembly.

Referring to FIG. 3, there is shown a partially sectional view illustrating a conventional structure of fixing the lens assembly 20 to the package 4. According to this fixing structure, the lens assembly 20 is spot-welded by laser to the package 4 at a plurality of positions 34 set over the entire outer circumference of the lens holder 22. In FIG. 3, it can be expressed that a displacement of the LD chip 10 equals a thermal expansion amount (A) of the bottom portion of the package 4+a thermal expansion amount (B) of the base 6+a thermal expansion amount (C) of the LD carrier 8. Further, it can be expressed that a displacement of the lens 24 equals a thermal expansion amount (D) of the side portion of the package 4+a thermal expansion amount (E) of the lens assembly 20.

The optical axis misalignment in the Y-axis direction between the lens assembly 20 and the laser beam emitted from the LD chip 10 due to a temperature change can be prevented by making the displacement of the LD chip 10 equal to the displacement of the lens 24. Since both the package 4 and the base 6 are formed of Kovar, the equation of A+B=D holds. Therefore, the lens assembly 20 must be fixed to the package 4 so that the equation of C=E must hold.

In the conventional fixing structure shown in FIG. 3, the lens holder 22 of the lens assembly 20 is laser-welded to the package 4 at the plural positions 34 set over the entire outer circumference of the lens holder 22. Accordingly, if the fixing strength at each laser-welded position is uniform against a thermal change, the lens holder 22 is displaced the same amount (D') as that of the package 4.

Figure 4:
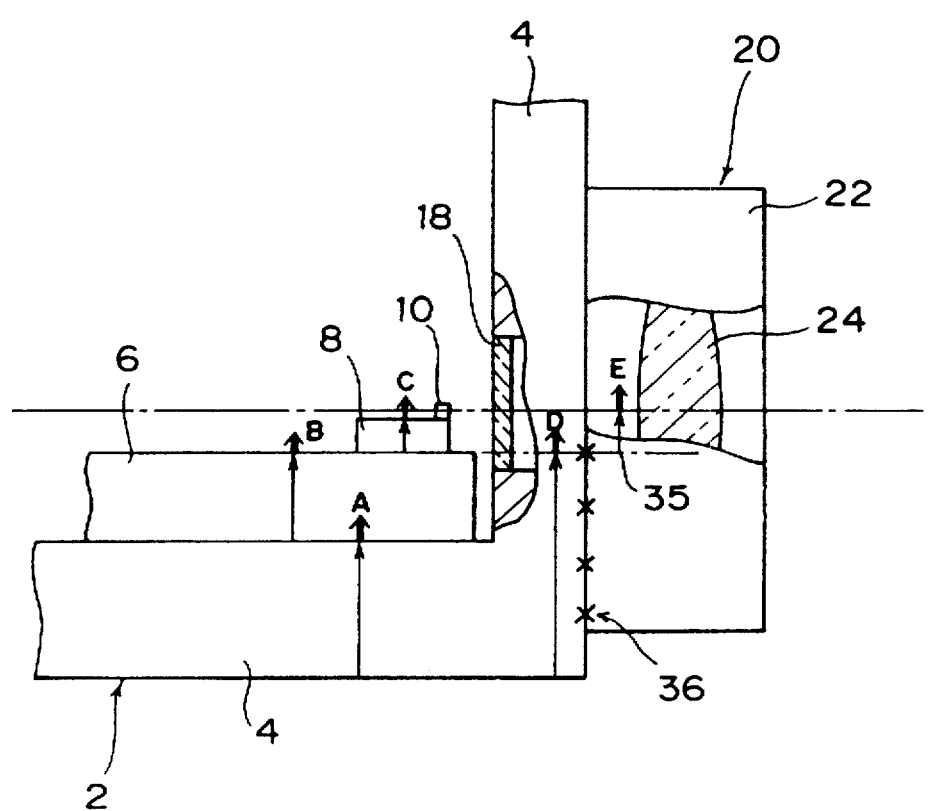
FIG. 4 is a partially sectional view showing a fixing structure according to a first preferred embodiment of the present invention.
Figure 5:
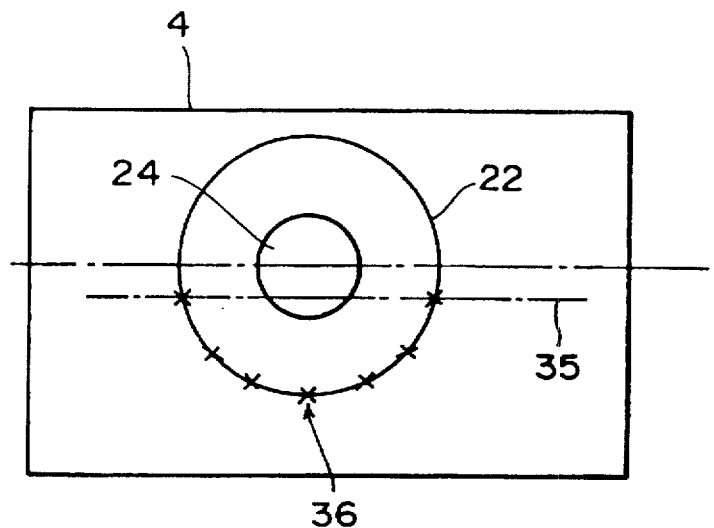
FIG. 5 is a right side view of FIG. 4.

FIGS. 4 and 5 show a fixing structure according to a first preferred embodiment of the present invention, which is characterized in that the fixing positions of the lens holder 22 to the package 4 are set in a limited region below the level of the upper surface of the base 6 of the semiconductor laser assembly 2. As best shown in FIG. 5, the outer circumference of the lens holder 22 is spot-welded by laser to the package 4 at a plurality of positions 36 set on and below an extension 35 of the upper surface of the base 6. The LD carrier 8 is formed of copper and the lens holder 22 is formed of stainless steel, so that the coefficients of linear expansion of these two members are almost equal to each other. Accordingly, in the fixed condition of the lens holder 22 to the package 4, the LD carrier 8 and the lens holder 22 are displaced by the same amount with a temperature change, so that the optical axis misalignment does not occur (C=E).

In the case where the LD carrier 8 is formed of any material other than copper, the optical axis misalignment can be suppressed by changing the fixing positions of the lens assembly 20 according to a thermal expansion amount of the material of the LD carrier 8. Carrying this thought a step further brings about a merit such that the temperature characteristics of the lens assembly 20 can be arbitrarily controlled according to the fixing positions of the lens holder 22. According to this preferred embodiment, the displacement in the Y-axis direction by a temperature change of 70° C. can be suppressed to about 0.3 μm, thereby reducing the insertion loss to about 0.7 dB.

Figure 6:
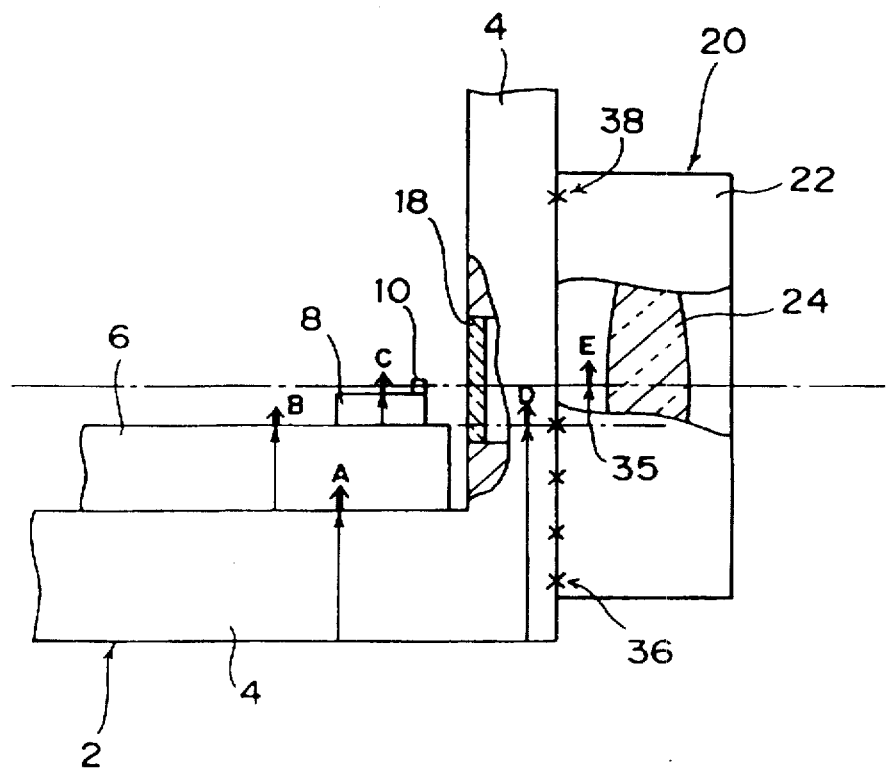
FIG. 6 is a partially sectional view showing a fixing structure according to a second preferred embodiment of the present invention.
Figure 7:
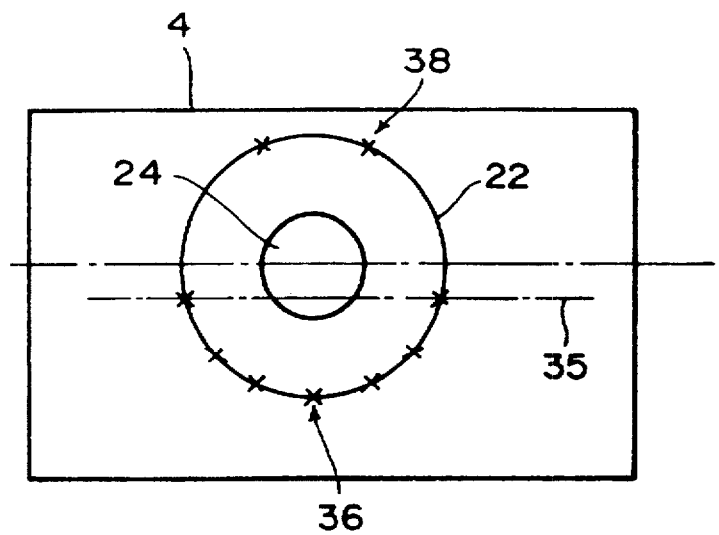
FIG. 7 is a right side view of FIG. 6.

Referring to FIGS. 6 and 7, there is shown a fixing structure according to a second preferred embodiment of the present invention. In this preferred embodiment, the fixing positions of the lens holder 22 to the package 4 are set not only at the plural positions 36 on and below the level of the upper surface of the base 6, but also at a plurality of (two in this preferred embodiment) positions 38 above the level of the upper surface of the base 6. The fixing strength at each position 38 is set small. The setting of such a small fixing strength at each position 38 may be realized by adjusting laser power and time of laser welding.

Thus, the lens holder 22 is fixed at the positions 38 with a small strength. Accordingly, the lens holder 22 is allowed to thermally expand freely to some extent in response to a temperature change, with no restraint by thermal expansion of the package 4. As a result, the displacement of the lens assembly 20 due to its thermal expansion can be made substantially equal to the displacement of the LD carrier 8 due to its thermal expansion. Furthermore, the overall fixing strength between the package 4 and the lens assembly 20 can be made larger than that in the first preferred embodiment.

Figure 8:
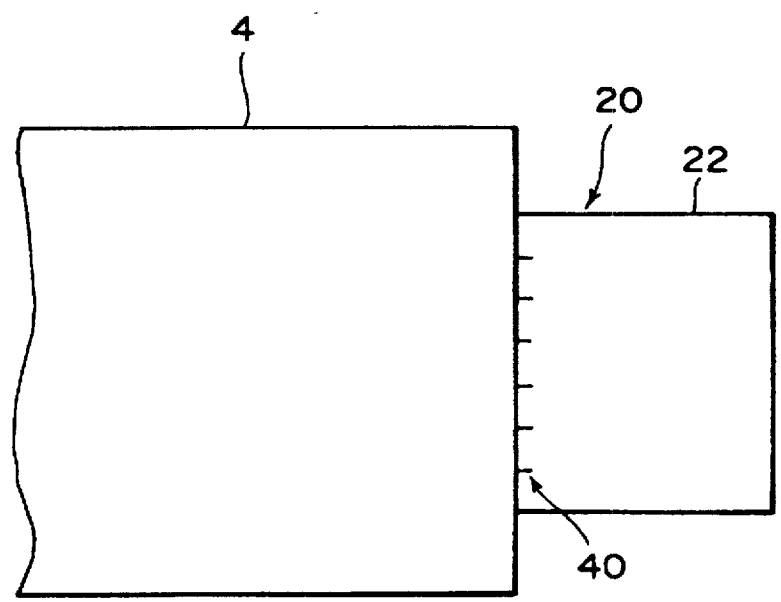
FIG. 8 is an elevational view showing a modification of the first preferred embodiment.

Referring to FIG. 8, there is shown an elevational view of a modification of the first preferred embodiment. As shown in FIG. 8, a scale 40 is provided on the outer circumferential portion of the lens holder 22 of the lens assembly 20, thereby facilitating selection of any fixing positions of the lens holder 22.

Figure 9A:
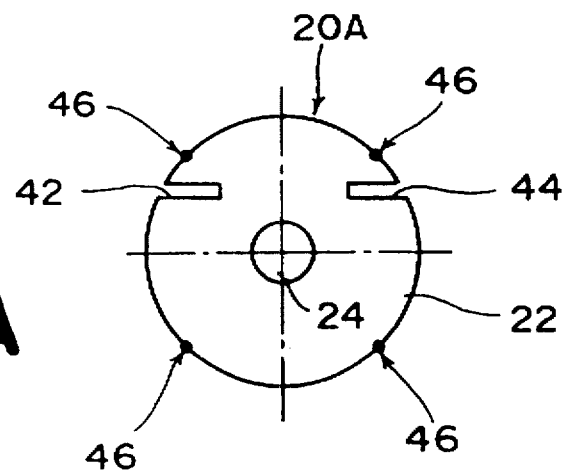
FIG. 9A is an elevational view of a lens assembly according to a third preferred embodiment of the present invention.
Figure 9B:
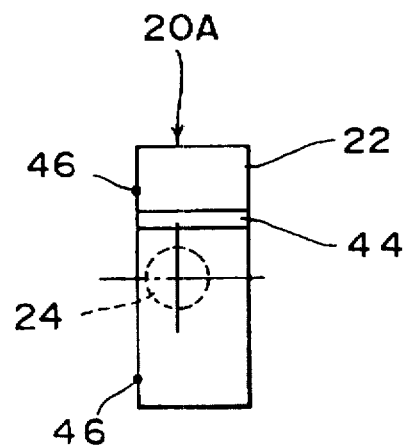
FIG. 9B is a right side view of FIG. 9A.

Referring to FIGS. 9A and 9B, there is shown a lens assembly 20A according to a third preferred embodiment of the present invention. The third preferred embodiment shown in FIGS. 9A and 9B and fourth to sixth preferred embodiments of the present invention shown in FIGS. 10A to 12B to be described later are so designed as to provide various lens holders specially formed, thereby preventing the optical axis misalignment between the lens and the LD chip. The structure of the semiconductor laser assembly and the fiber assembly is similar to that in the prior art. As shown in FIG. 9A, a pair of horizontal slits 42 and 44 are formed in the lens holder 22 at positions just below two upper ones of four laser welding points 46 set on the outer circumference of the lens holder 22.

Since the laser welding points 46 set on the outer circumference of the lens holder 22 are laser-welded to the package, the thermal expansion amount at the laser welding points 46 is restricted to substantially the same as the thermal expansion amount of the package. However, owing to the horizontal slits 42 and 44 formed in the lens holder 22, the other portion of the lens holder 22 except the laser welding points 46 is allowed to freely thermal expand. Accordingly, the lens 24 is displaced substantially the same amount as the displacement of the LD carrier by thermal expansion in the Y-axis direction, thus preventing the optical axis misalignment between the LD chip and the lens 24. As a result, a variation in light output from the semiconductor laser module due to a temperature change can be suppressed.

Figure 10A:
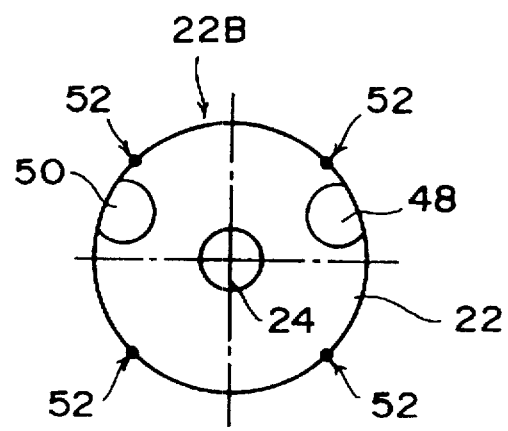
FIG. 10A is an elevational view of a lens assembly according to a fourth preferred embodiment of the present invention.
Figure 10B:
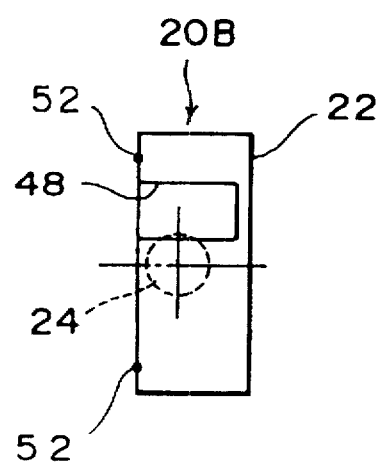
FIG. 10B is a right side view of FIG. 10A.

Referring to FIGS. 10A and 10B, there is shown a lens assembly 20B according to a fourth preferred embodiment of the present invention. In this preferred embodiment, a pair of axial recesses 48 and 50 are formed on the outer circumferential surface of the lens holder 22 so as to have open ends located at positions just below two upper ones of four laser welding points 52 set on the outer circumference of the lens holder 22. Owing to the axial recesses 48 and 50, the lens 24 can be displaced under substantially the same condition as that of the LD carrier like the third preferred embodiment mentioned above, thus preventing the optical axis misalignment between the LD chip and the lens 24.

Figure 11A:
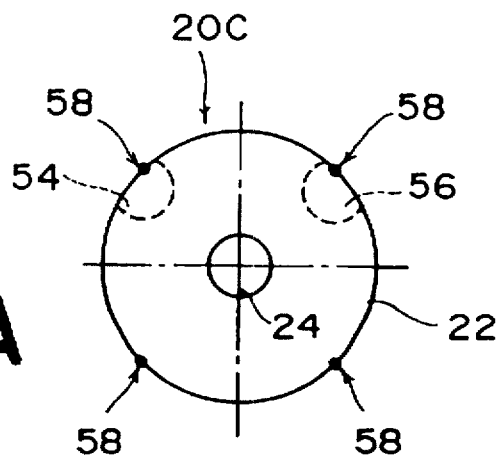
FIG. 11A is an elevational view of a lens assembly according to a fifth preferred embodiment of the present invention.
Figure 11B:
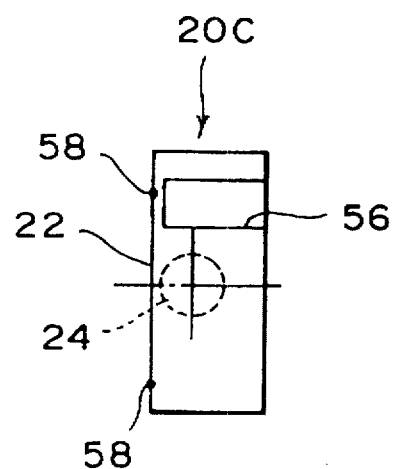
FIG. 11B is a right side view of FIG. 11A.

Referring to FIGS. 11A and 11B, there is shown a lens assembly 20C according to a fifth preferred embodiment of the present invention. In this preferred embodiment, a pair of axial recesses 54 and 56 are formed on the outer circumferential surface of the lens holder 22 as similar to the fourth preferred embodiment shown in FIGS. 10A and 10B. However, unlike the axial recesses 48 and 50 in the fourth preferred embodiment, the axial recesses 54 and 56 in this preferred embodiment have open ends on the side opposite to the open ends of the axial recesses 48 and 50. Furthermore, two upper ones of four laser welding points 58 set on the outer circumference of the lens holder 22 are located at the bottom portions of the axial recesses 54 and 56, that is, at thin-walled portions of the lens holder 22. Accordingly, the thin-walled portions of the lens holder 22 are laser-welded to the package, thereby facilitating thermal expansion of the lens holder 22 with no restriction by the package. Thus, the optical axis misalignment between the LD chip and the lens 24 can be suppressed.

Figure 12A:
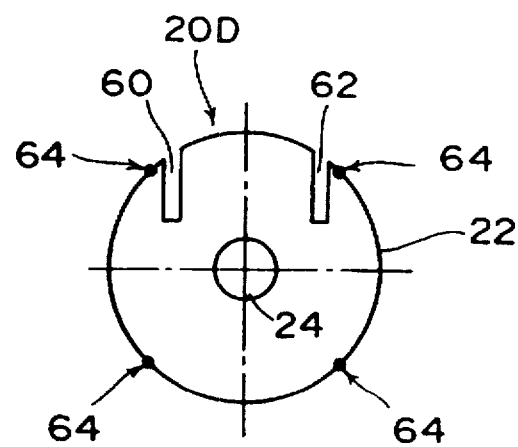
FIG. 12A is an elevational view of a lens assembly according to a sixth preferred embodiment of the present invention.
Figure 12B:
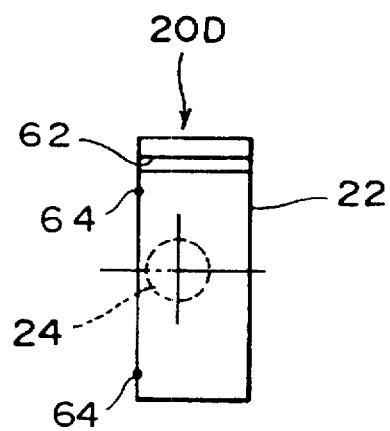
FIG. 12B is a right side view of FIG. 12A.

Referring to FIGS. 12A and 12B, there is shown a lens assembly 20D according to a sixth preferred embodiment of the present invention. In this preferred embodiment, a pair of vertical slits 60 and 62 are formed in the vicinity of two upper ones of four laser welding points 64 set on the outer circumference of the lens holder 22. Owing to the vertical slits 60 and 62, free thermal expansion of the other portion of the lens holder 22 except the laser welding points 64 is allowed, so that the lens 24 can be displaced in the Y-axis direction under substantially the same condition as that of the LD carrier. Thus, the optical axis misalignment between the LD chip and the lens 24 can be suppressed.

Figure 13:
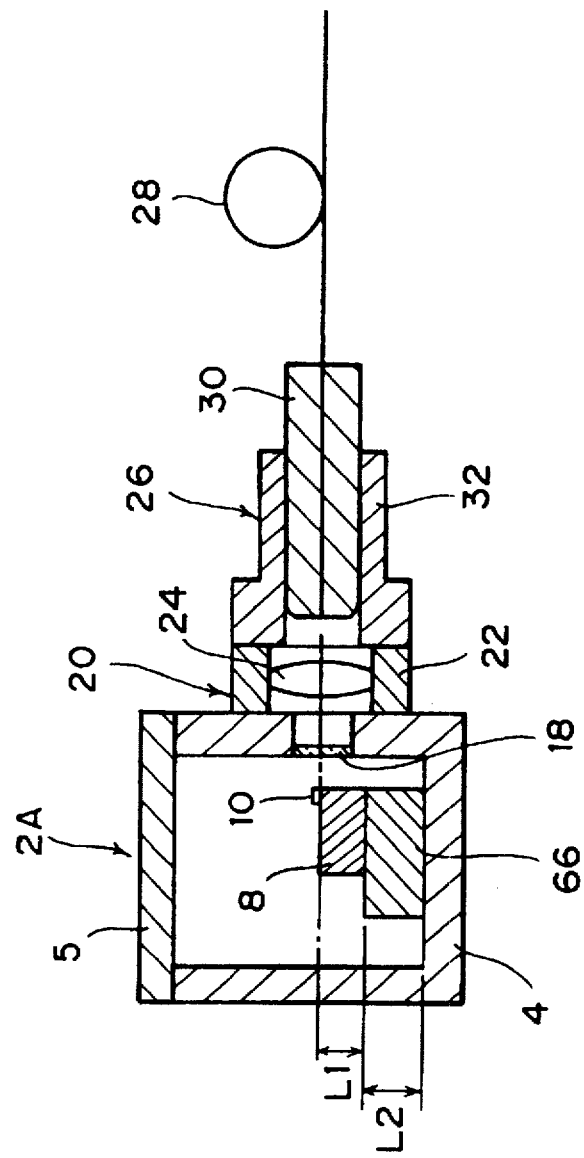
FIG. 13 is a sectional view of a seventh preferred embodiment of the present invention.

Referring to FIG. 13, there is shown a sectional view of a semiconductor laser module according to a seventh preferred embodiment of the present invention. In this preferred embodiment, substantially the same parts as those in the first preferred embodiment are denoted by the same reference numerals, and the description thereof will be omitted to avoid repetition. A semiconductor laser assembly 2A in this preferred embodiment is sealed by welding a cover 5 to a package 4. An LD carrier 8 is formed of copper, and a base 66 is formed of invar containing 64% of Fe and 35.5% of Ni. Invar has a coefficient of linear expansion of $2 \times 10^{-6}$.

Letting $\alpha 1$, $\alpha 2$, and $\alpha 3$ denote the coefficients of linear expansion of the LD carrier 8, the base 66, and the package 4, respectively, and L1 and L2 denote the vertical thicknesses of the LD carrier 8 and the base 66, respectively, the displacement $\Delta S$ of a laser beam emitted from an LD chip 10 per unit temperature of the LD chip 10 is given by the following expression.

$$\Delta S = L1\alpha 1 + L2\alpha 2 - (L1+L2)\alpha 3$$

$$= L1(\alpha 1 - \alpha 3) - L2(\alpha 3 - \alpha 2)$$

Accordingly, the temperature characteristics of the semiconductor laser module having a good optical coupling efficiency can be obtained by deciding each parameter so as to satisfy the equation of $\Delta S=0$, i.e., $L1(\alpha 1-\alpha 3)=L2(\alpha 3-\alpha 2)$. The coefficient of linear expansion $\alpha 1$ of the LD carrier 8 formed of copper is $18 \times 10^{-6}$; the coefficient of linear expansion $\alpha 2$ of the base 66 formed of invar is $2 \times 10^{-6}$; and the coefficient of linear expansion $\alpha 3$ of the package 4 formed of Kovar is $6 \times 10^{-6}$. Therefore, the above equation is satisfied under the condition of $L1/L2=\frac{1}{3}$.

Figure 14:
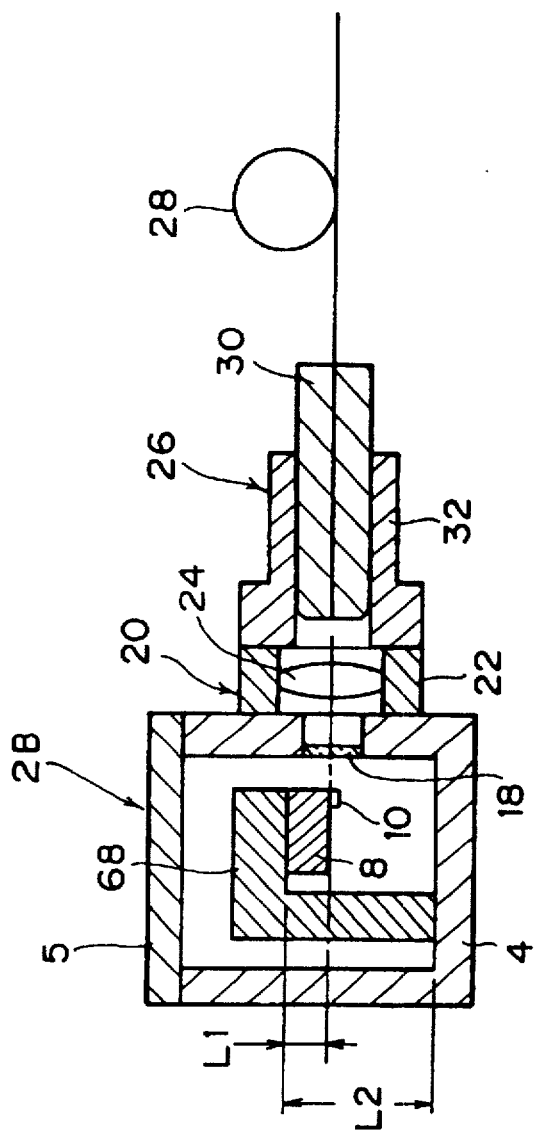
FIG. 14 is a sectional view of an eighth preferred embodiment of the present invention.

Referring to FIG. 14, there is shown a semiconductor laser module according to an eighth preferred embodiment of the present invention. A semiconductor laser assembly 2B in this preferred embodiment employs an inverted L-shaped base 68 formed of iron. The inverted L-shaped base 68 is fixed by welding to a package 4. An LD carrier 8 is fixed to the lower surface of the inverted L-shaped base 68, and an LD chip 10 is fixed to the lower surface of the LD carrier 8.

Letting $\alpha 1$, $\alpha 2$, and $\alpha 3$ denote the coefficients of linear expansion of the LD carrier 8, the inverted L-shaped base 68, and the package 4, respectively, L1 denote the vertical thickness of the LD carrier 8, and L2 denote the distance in the inverted L-shaped base 68 from the inside bottom surface of the package 4 to the upper surface of the LD carrier 8 (i.e., the LD carrier mounting surface of the base 68), the displacement $\Delta S$ of a laser beam emitted from the LD chip 10 per unit temperature of the LD chip 10 is given by the following expression.

$$\Delta S = L2\alpha 2 - L1\alpha 1 - (L2-L1)\alpha 3$$

$$= L2(\alpha 2 - \alpha 3) - L1(\alpha 1 - \alpha 3)$$

Accordingly, the temperature characteristics of the semiconductor laser module having a good optical coupling efficiency can be obtained by deciding each parameter so as to satisfy the equation of $\Delta S=0$, i.e., $L2(\alpha 2-\alpha 3)=L1(\alpha 1-\alpha 3)$. The coefficient of linear expansion $\alpha 1$ of the LD carrier 8 formed of copper is $18 \times 10^{-6}$; the coefficient of linear expansion $\alpha 2$ of the inverted L-shaped base 68 formed of iron is $12 \times 10^{-6}$; and the coefficient of linear expansion $\alpha 3$ of the package 4 formed of Kovar is $6 \times 10^{-6}$. Therefore, the above equation is satisfied under the condition of $L1/L2=\frac{1}{2}$.

Figure 15:
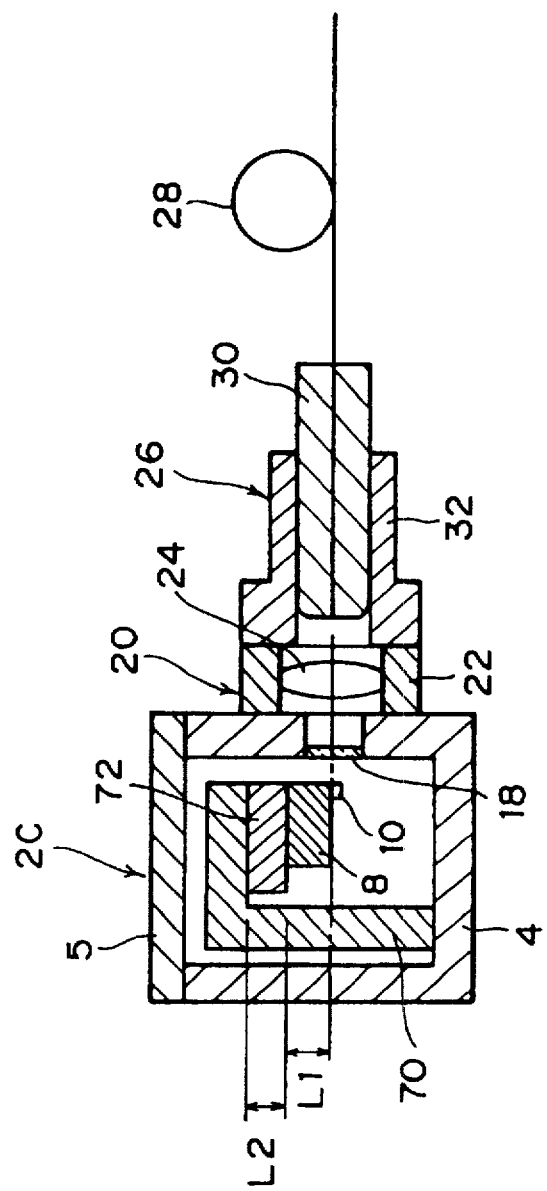
FIG. 15 is a sectional view of a ninth preferred embodiment of the present invention.

Referring to FIG. 15, there is shown a semiconductor laser module 2C according to a ninth preferred embodiment of the present invention. This preferred embodiment employs an inverted L-shaped holder 70 having the same coefficient of linear expansion as that of a package 4. The inverted L-shaped holder 70 is fixed by welding to the package 4. A base 72 is fixed by welding to the lower surface of the inverted L-shaped holder 70, and an LD carrier 8 is fixed by welding to the lower surface of the base 72. Further, an LD chip 10 is fixed to the lower surface of the LD carrier 8.

Letting $\alpha 1$, $\alpha 2$, and $\alpha 3$ denote the coefficients of linear expansion of the LD carrier 8, the base 72, and the package 4, respectively, and L1 and L2 denote the vertical thicknesses of the LD carrier 8 and the base 72, respectively, the displacement $\Delta S$ of a laser beam emitted from an LD chip 10 per unit temperature of the LD chip 10 is given by the following expression.

$$\Delta S = L1\alpha 1 + L2\alpha 2 - (L1+L2)\alpha 3$$

Accordingly, the temperature characteristics of the semiconductor laser module having a good optical coupling efficiency can be obtained by deciding each parameter so as to satisfy the equation of $\Delta S=0$, i.e., $L1(\alpha 1-\alpha 3)=L2(\alpha 3-\alpha 2)$. The coefficient of linear expansion $\alpha 1$ of the LD carrier 8 formed of copper is $18 \times 10^{-6}$; the coefficient of linear expansion $\alpha 2$ of the base 72 formed of invar is $2 \times 10^{-6}$; and the coefficient of linear expansion $\alpha 3$ of the package 4, i.e., the holder 72 formed of Kovar is $6 \times 10^{-6}$. Therefore, the above equation is satisfied under the condition of $L1/L2=\frac{1}{3}$.

According to the present invention as described above, the optical axis misalignment between the semiconductor laser and the lens can be suppressed to thereby reduce a variation in light output.

What is claimed is:

1. A semiconductor laser module comprising:

a semiconductor laser assembly comprising a package having a transparent window and a first coefficient of linear expansion, a base fixedly mounted on an inside surface of said package and having a second coefficient of linear expansion which is substantially identical to the first coefficient of linear expansion, a carrier fixedly mounted on said base and having a third coefficient of linear expansion which is greater than the first and the second coefficients of linear expansion, and a semiconductor laser mounted on said carrier;

a lens assembly fixed by welding to said package, said lens assembly comprising a lens holder and a lens press-fitted in said lens holder, said lens holder being spot-welded to said package at a plurality of positions all of which are set below an upper surface of said base, said lens holder having a fourth coefficient of linear expansion which is generally identical to the third coefficient of linear expansion; and a fiber assembly fixed by welding to said lens assembly, said fiber assembly comprising a holder, a ferrule inserted and fixed in said holder, and an optical fiber inserted and fixed in said ferrule.

2. A semiconductor laser module according to claim 1, wherein said lens holder is spot-welded to said package further at a plurality of positions set above said upper surface of said base with a relatively small fixing strength.

3. A semiconductor laser module according to claim 1, wherein said lens holder is a cylindrical member having a scale on an outer circumferential portion thereof.

4. A semiconductor laser module comprising:

a semiconductor laser assembly comprising a package having a transparent window and a first coefficient of linear expansion, a base fixedly mounted on an inside surface of said package and having a second coefficient of linear expansion which is substantially identical to the first coefficient of linear expansion, a carrier fixedly mounted on said base and having a third coefficient of linear expansion which is greater than the first and the second coefficients of linear expansion, and a semiconductor laser mounted on said carrier;

a lens assembly fixed by welding to said package, said lens assembly comprising a lens holder and a lens press-fitted in said lens holder, said lens holder being spot-welded to said package at upper positions and lower positions leaving a non-welded intermediate section holding said lens, said lens holder having a plurality of slits in said intermediate section; and a fiber assembly fixed by welding to said lens assembly, said fiber assembly comprising a holder, a ferrule inserted and fixed in said holder, and an optical fiber inserted and fixed in said ferrule.

5. A semiconductor laser module according to claim 4, wherein said slits comprise a pair of horizontal slits formed in an upper portion of the intermediate section of said lens holder above a horizontal center line of said lens holder so as to horizontally extend from an outer circumferential surface of said lens holder in substantially opposite directions.

6. A semiconductor laser module according to claim 4, wherein said slits comprise a pair of vertical slits formed in an upper portion of said lens holder above a horizontal center line of said lens holder so as to vertically extend from an outer circumferential surface of said lens holder.

7. A semiconductor laser module comprising:

a semiconductor laser assembly comprising a package having a transparent window and a first coefficient of linear expansion, a base fixedly mounted on an inside surface of said package and having a second coefficient of linear expansion which is substantially identical to the first coefficient of linear expansion, a carrier fixedly mounted on said base and having a third coefficient of linear expansion which is greater than the first and the second coefficients of linear expansion, and a semiconductor laser mounted on said carrier;

a lens assembly fixed by welding to said package, said lens assembly comprising a lens holder and a lens press-fitted in said lens holder, said lens holder being spot-welded to said package at upper positions and lower positions leaving a non-welded intermediate section holding said lens, said lens holder having a plurality of axial recesses formed on an outer circumferential surface of an upper portion of the intermediate section of said lens holder above a horizontal center line of said lens holder; and a fiber assembly fixed by welding to said lens assembly, said fiber assembly comprising a holder, a ferrule inserted and fixed in said holder, and an optical fiber inserted and fixed in said ferrule.

8. A semiconductor laser module comprising:

a semiconductor laser assembly comprising a package having a transparent window and a first coefficient of linear expansion, a base fixedly mounted on an inside surface of said package and having a second coefficient of linear expansion which is substantially identical to the first coefficient of linear expansion, a carrier fixedly mounted on said base and having a third coefficient of linear expansion which is greater than the first and the second coefficients of linear expansion, and a semiconductor laser mounted on said carrier;

a lens assembly fixed by welding to said package, said lens assembly comprising a lens holder and a lens press-fitted in said lens holder, said lens holder having a plurality of axial recesses formed on an outer circumferential surface of an upper portion of said lens holder above a horizontal center line of said lens holder; and a fiber assembly fixed by welding to said lens assembly, said fiber assembly comprising a holder, a ferrule inserted and fixed in said holder, and an optical fiber inserted and fixed in said ferrule;

wherein said axial recesses axially extended from one side surface of said lens holder on said fiber assembly side toward the other side surface of said lens holder to form thin-walled portions on said package side, and both an outer circumference of a lower portion of said lens holder below said horizontal center line of said lens holder and said thin-walled portions are spot-welded to said package.

9. A semiconductor laser module comprising:

a semiconductor laser assembly comprising a package having a transparent window, a base fixedly mounted on an inside surface of said package, a carrier fixedly mounted on said base, and a semiconductor laser mounted on said carrier;

a lens assembly fixed by welding to said package, said lens assembly comprising a lens holder and a lens press-fitted in said lens holder; and a fiber assembly fixed by welding to said lens assembly, said fiber assembly comprising a holder, a ferrule inserted and fixed in said holder, and an optical fiber inserted and fixed in said ferrule;

wherein a relation of $L1(\alpha 1-\alpha 3)=L2(\alpha 3-\alpha 2)$ is satisfied where $\alpha 1$, $\alpha 2$, and $\alpha 3$ represent coefficients of linear expansion of said carrier, said base, and said package, respectively, and L1 and L2 represent vertical thicknesses of said carrier and said base, respectively.

10. A semiconductor laser module according to claim 9, wherein said carrier, said base, and said package are formed of copper, invar, and Kovar, respectively, and an equation of $L1/L2=\frac{1}{3}$ holds.

11. A semiconductor laser module comprising:

a semiconductor laser assembly comprising a package having a transparent window, an inverted L-shaped base fixedly mounted on an inside bottom surface of said package, a carrier fixedly mounted on a lower surface of said inverted L-shaped base, and a semiconductor laser mounted on a lower surface of said carrier;

a lens assembly fixed by welding to said package, said lens assembly comprising a lens holder and a lens press-fitted in said lens holder; and a fiber assembly fixed by welding to said lens assembly, said fiber assembly comprising a holder, a ferrule inserted and fixed in said holder, and an optical fiber inserted and fixed in said ferrule;

wherein a relation of $L2(\alpha 2-\alpha 3)=L1(\alpha 1-\alpha 3)$ is satisfied where $\alpha 1$, $\alpha 2$, and $\alpha 3$ represent coefficients of linear expansion of said carrier, said base, and said package, respectively, L1 represents a vertical thickness of said carrier, and L2 represents a distance in said inverted L-shaped base from said inside bottom surface of said package to an upper surface of said carrier.

12. A semiconductor laser module according to claim 11, wherein said carrier, said inverted L-shaped base, and said package are formed of copper, iron, and Kovar, respectively, and an equation of $L1/L2=½$ holds.

13. A semiconductor laser module comprising:

a semiconductor laser assembly comprising a package having a transparent window, an inverted L-shaped holder fixedly mounted on an inside surface of said package and having a coefficient of linear expansion equal to that of said package, a base fixed to a lower surface of said inverted L-shaped holder, a carrier fixed to a lower surface of said base, and a semiconductor laser fixed to a lower surface of said carrier;

a lens assembly fixed by welding to said package, said lens assembly comprising a lens holder and a lens press-fitted in said lens holder; and a fiber assembly fixed by welding to said lens assembly, said fiber assembly comprising a holder, a ferrule inserted and fixed in said holder, and an optical fiber inserted and fixed in said ferrule;

wherein a relation of $L1(\alpha 1-\alpha 3)=L2(\alpha 3-\alpha 2)$ is satisfied where $\alpha 1$, $\alpha 2$, and $\alpha 3$ represent coefficients of linear expansion of said carrier, said base, and said package, respectively, and L1 and L2 represent vertical thicknesses of said carrier and said base, respectively.

14. A semiconductor laser module according to claim 13, wherein said carrier, said base, said holder, and said package are formed of copper, invar, Kovar, and Kovar, respectively, and an equation of $L1/L2=⅓$ holds.

15. A semiconductor laser module comprising:

a semiconductor laser assembly including a package having a base fixedly mounted on an interior surface of said package, a carrier fixedly mounted on said base, and a semiconductor laser mounted on said carrier; and a lens assembly fixed by welding to said package, said lens assembly including a lens holder, said lens holder being spot-welded to said package at a plurality of positions, all of which are set below an upper surface of said base;

wherein coefficients of linear expansion of the carrier and the lens holder are substantially the same.

* * * * *